(12) United States Patent
Forster

(10) Patent No.: US 10,685,273 B2
(45) Date of Patent: Jun. 16, 2020

(54) VIBRATORY FEEDER SYSTEMS FOR RFID ELEMENTS

(71) Applicant: Avery Dennison Retail Information Services, LLC, Westborough, MA (US)

(72) Inventor: Ian Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 256 days.

(21) Appl. No.: 15/288,212

(22) Filed: Oct. 7, 2016

(65) Prior Publication Data

US 2018/0101759 A1    Apr. 12, 2018

(51) Int. Cl.

| | | |
|---|---|---|
| *G06K 19/077* | (2006.01) | |
| *B29C 65/48* | (2006.01) | |
| *B29C 65/64* | (2006.01) | |
| *B31D 1/02* | (2006.01) | |
| *G06K 7/10* | (2006.01) | |

(Continued)

(52) U.S. Cl.
CPC ........ *G06K 19/07718* (2013.01); *B29C 65/48* (2013.01); *B29C 65/64* (2013.01); *B31D 1/028* (2013.01); *G06K 7/10366* (2013.01); *G06K 19/025* (2013.01); *G06K 19/07749* (2013.01); *G06K 19/07775* (2013.01); *B29L 2007/004* (2013.01)

(58) Field of Classification Search
CPC ...................................................... B31D 1/028
USPC ........................................................ 235/492
See application file for complete search history.

(56) References Cited

U.S. PATENT DOCUMENTS 5,708,419 A    1/1998  Isaacson et al.
5,852,869 A *  12/1998 Gieskes ............... H05K 13/028
                                                              29/834

(Continued)

FOREIGN PATENT DOCUMENTS

| EP | 2306372 | 4/2011 |
|---|---|---|
| EP | 2401705 | 3/2014 |
| JP | 2005129803 A * | 5/2005 |

OTHER PUBLICATIONS

Machine translation of JP 2005-129803, European Patent Office, retrieved Dec. 4, 2018 (Year: 2018).*

(Continued)

*Primary Examiner* — Suezu Ellis
(74) *Attorney, Agent, or Firm* — Avery Dennison Retail Information Services, LLC

(57) ABSTRACT

Systems and methods for processing RFID element or chip components allow for the use of relatively common and inexpensive vibratory feeder handling equipment that require a much lower capital cost than systems incorporating technology such as flip chipping or direct punching down approaches. Instead, vibratory feeders provide feed handling equipment for the RFID element or chip components, which are subsequently fed and combined with RFID antennas in forming RFID devices such as RFID tags. The RFID chips are formed on or of non-silicon substrates such as printed parts. These substrates are relatively flexible, of materials such as polymeric sheets or other plastics. A stream of the RFID components is presented at a transfer station to an ordered series of RFID antennas, with the RFID components and antennas being combined in forming RFID devices.

17 Claims, 5 Drawing Sheets

(51) Int. Cl.
  *G06K 19/02* (2006.01)
  *B29L 7/00* (2006.01)

(56) References Cited

U.S. PATENT DOCUMENTS

| | | | |
|---|---|---|---|
| 6,147,662 A * | 11/2000 | Grabau | G06K 19/07718 340/572.1 |
| 6,384,727 B1 * | 5/2002 | Diprizio | G06K 19/077 340/572.7 |
| 6,598,730 B1 | 7/2003 | Gertsch | |
| 7,564,356 B1 | 7/2009 | Youn | |
| 7,806,158 B2 | 10/2010 | Freund | |
| 8,062,445 B2 | 11/2011 | Kian | |
| 8,179,259 B2 | 5/2012 | Bolotin et al. | |
| 8,246,773 B2 | 8/2012 | Green et al. | |
| 8,350,703 B2 | 1/2013 | Gengel | |
| 8,763,910 B2 | 7/2014 | Hansen | |
| 8,912,907 B2 | 12/2014 | Gengel et al. | |
| 2005/0128086 A1 | 6/2005 | Brown et al. | |
| 2006/0176179 A1 * | 8/2006 | Skorpik | G06K 19/0717 340/572.8 |
| 2006/0176180 A1 | 8/2006 | Freund | |
| 2007/0284759 A1 * | 12/2007 | Suguro | G06K 19/07718 257/783 |
| 2008/0310938 A1 * | 12/2008 | Inoue | H01L 21/67132 414/151 |
| 2009/0087651 A1 * | 4/2009 | Doublet | B32B 27/04 428/337 |
| 2010/0214080 A1 | 8/2010 | Alexis | |
| 2012/0098648 A1 | 4/2012 | Kaga et al. | |
| 2016/0019405 A1 | 1/2016 | Bolotin et al. | |
| 2018/0032852 A1 * | 2/2018 | Foucault | G06K 19/07718 |

OTHER PUBLICATIONS

International Search Report and Written Opinion prepared for PCT/US2017/055532 dated Jan. 23, 2018.

* cited by examiner

VIBRATORY FEEDER SYSTEMS FOR RFID ELEMENTS

BACKGROUND

Field of the Disclosure

The present subject matter relates to manufacturing radio frequency identification ("RFID") components that include an RFID element such as an RFID chip thereby assembled to another RFID component, such as an antenna. The subject matter includes handling and ordering of the RFID elements or chips and presenting same for assembly according to manufacturing systems and methods.

Description of Related Art

RFID tags and labels (collectively referred to herein as "devices") are widely used to associate an object with an identification code. RFID devices generally have a combination of antennae and analog and/or digital electronics, which may include, for example, communications electronics, data memory, and control logic. For example, RFID tags are used in conjunction with retail security systems, security locks in cars, for access control to buildings, and for tracking inventory and parcels. Various examples of RFID tags and labels are known in the art.

Automatic identification of products has become commonplace. For example, the ubiquitous technology used for automatic identification products is RFID. RFID uses labels or "tags" that include electronic components that respond to radio frequency ("RC") commands and signals to provide identification of each tag wirelessly. Generally, RFID tags and labels comprise an integrated circuit ("IC", or chip) attached to an antenna that responds to a reader using radio waves to store and access the information in the chip.

One of the obstacles to more widespread adoption of RFID technology is the cost of RFID tags and difficulties for optimization of economical manufacturing of RFID tags. Increased demand for RFID tags has manufacturers continuously seeking cost reduction and manufacturing simplification and speed. One area for which cost reduction and manufacturing simplification and speed are sought concerns methods and systems for assembling components of RFID devices, such as assembling RFID elements or chips to an RFID antenna in an inexpensive and efficient manner, taking into consideration the propensity for damage to typical RFID elements or chips. Current methods typically provide RFID chips on substrates on single crystalline material, such as silicon wafers, which tend to be susceptible to chipping or damage. For example, a plurality of standard current silicon RFID chips are commonly provided on a wafer, to be placed on an antenna, interposer or other surface.

Also, assembly difficulties tend to increase as RFID chips and their components become smaller. For example, to interconnect the relatively small contact pads on the chips with the antennas, intermediate structures variously referred to as "straps," "interposers," and "carriers" are sometimes used to facilitate manufacture. Interposers for example typically include conductive leads or pads that are electrically coupled to the contact pads of the chips for coupling to the antennas. Depending on intended use or other requirements, antennas will be assembled to or with these types of components Examples of traditional assembly methods include removing RFID elements or chips from their wafer substrate by so called "flip chip" methods where the RFID element or chip is ejected from the wafer, picked up by a vacuum head, rotated (to achieve the flip), transferred to another vacuum head before being placed onto the desired component such as the antenna or interposer. Another traditional method is described as a "direct punch-down" by which the wafer is placed above the desired component such as antenna or interposer, and a pin pushes a chip out of the wafer down into the component for assembly such as antenna or interposer. Either of these approaches requires expensive equipment in order to properly deliver a single chip from its wafer to a component such as an antenna or interposer.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Generally, aspects or embodiments of the present disclosure allow for the use of relatively common and inexpensive vibratory feeder handling equipment that require a much lower capital cost than systems incorporating technology such as flip chipping or direct punching down approaches. Instead, vibratory feeders provide feed handling equipment for the manufacturing methods and systems of the present disclosure. Included in the disclosure is providing RFID chips formed on or of non-silicon substrates such as printed parts. These substrates are relatively flexible, of materials such as polymeric sheets or other plastics.

Other aspects or embodiments of the present disclosure allow for the use of relatively common and inexpensive vibratory feeder handling equipment that require a much lower capital cost than systems incorporating technology such as flip chipping or direct punching down approaches. Instead, vibratory feeders provide feed handling equipment for the manufacturing methods and systems of the present disclosure. Included in the disclosure is providing RFID chips that are inherently flexible and with printed electronics, such as being made primarily from non-silicon organic or inorganic semiconductors, including polymers and metal oxide semiconductors. Some can be based on polythiophene, the polymer semiconductor, printed on a relatively flexible material such as polyester film. Others can utilize polymer semiconductors used for printing the circuitry.

In one aspect, embodiments of a system and method of producing RFID components having an RFID chip or other element assembled with an antenna component, and RFID components thus produced, are provided. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support. The lead RFID component and one of the RFID antennas join together at a transfer station at which the lead RFID component combines with one of the RFID antennas to form a combined RFID component and antenna, which collects at a location downstream of the transfer station. With or without further processing or added components, a plurality of RFID devices can be formed.

Other aspects or embodiments concern a system and method of producing RFID components having an RFID chip or other element assembled with an antenna component, and RFID components thus produced. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support that follows a move and stop pattern. The lead RFID component and one of the RFID antennas enter a transfer station, the movable support stops, and the lead RFID component engages one of the RFID antennas to form a combined RFID component and antenna, which collects at a location downstream of the transfer station. With or without further processing or added components, a plurality of RFID devices can be formed.

Further aspects or embodiments concern a system and method of producing RFID components having an RFID chip or other element assembled with an antenna component, and RFID components thus produced. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support that follows a move and stop pattern. The lead RFID component and one of the RFID antennas enter a transfer station, the movable support stops, a pusher engages the lead RFID component into engagement with one of the RFID antennas to form a combined RFID component and antenna, which collects at a location downstream of the transfer station. With or without further processing or added components, a plurality of RFID devices can be formed.

Added aspects or embodiments concern a system and method of producing RFID components having an RFID chip or other element assembled with an antenna component, and RFID components thus produced. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support that follows a continuous flow pattern. The lead RFID component and one of the RFID antennas enter a transfer station, a pusher engages and moves with the RFID component in response to movement of the movable support, with the lead RFID component engaging one of the RFID antennas to form a combined RFID component and antenna, which collect at a location downstream of the transfer station. With or without further processing or added components, a plurality of RFID devices can be formed.

According to another aspect, embodiments concern a system and method of producing RFID components having an RFID chip or other element assembled with an antenna component, and RFID components thus produced. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support. A vacuum cylinder mechanism is operatively positioned between the stream of RFID components and the movable support and receives each lead RFID component from their stream and moves same to a transfer station, typically while timing delivery of the RFID components to the transfer station to coordinate closely with the phase and timing of delivery of the RFID antennas to the transfer station. At the transfer station, the RFID components and the RFID antennas combine to form a series of combined RFID components and antennas, which collect at a location downstream of the transfer station.

Further aspects or embodiments concern a system and method of producing RFID components having an RFID chip or other element assembled with an antenna component, and RFID components thus produced. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support. A vacuum cylinder mechanism is operatively positioned between the stream of RFID components and the movable support and receives each lead RFID component from their stream in serial fashion, with the vacuum cylinder mechanism spacing the plurality of RFID components at a distance that correlates with spacing between the plurality of RFID antennas in ordered sequence on the movable support and to the transfer station to coordinate closely with the phase and timing of delivery of the RFID antennas to the transfer station. At the transfer station, the RFID components and the RFID antennas combine to form a series of combined RFID components and antennas, which collect at a location downstream of the transfer station.

Another aspect and embodiments of a system and method of producing RFID components having an RFID chip or other element assembled with an antenna component, and RFID components thus produced, are provided. Such embodiments include providing a plurality RFID components that are RFID elements (such as chips) that are inherently relatively flexible; placing the plurality of the RFID components into a vibratory feeder and allowing the vibratory feeder to orient the RFID components in at least one stream, the stream comprising a plurality of the RFID components, the leading one of which is a lead RFID component. A plurality of RFID antennas are on a movable support. The lead RFID component and one of the RFID antennas join together at a transfer station at which the lead RFID component combines with one of the RFID antennas in conjunction with a securement feature that includes adhesives, conductive adhesives, dielectric adhesives, pressure sensitive adhesives, epoxy adhesives, anisotropic conductive paste, heat sensitive adhesives, heat and pressure sensitive adhesives, hot melt adhesives, welding, ultrasonic welding, electronic welding, magnet field systems, electronic field systems, and combinations thereof. The result is a combined RFID component and antenna, which collects at a location downstream of the transfer station. With or without further processing or added components, a plurality of RFID devices can be formed.

In a further aspect, embodiments of a system and method of producing RFID components having an RFID chip or other element assembled with an antenna component, and RFID components thus produced, are provided. Such embodiments include providing a plurality of RFID components that are RFID elements (such as chips) that are inherently relatively flexible. These RFID components exhibit an orientation feature as the RFID components vibrate in a vibratory feeder and allowing the vibratory feeder to orient the RFID components in at least one stream, the stream comprising a plurality of the RFID components, the leading one of which is a lead RFID component. A plurality of RFID antennas are on a movable support. The lead RFID component and one of the RFID antennas join together at a transfer station at which the lead RFID component combines with one of the RFID antennas to form a combined RFID component and antenna, which collects at a location downstream of the transfer station. The orientation feature enhances orientation of the RFID components with respect to the RFID antennas for the combined RFID components and antennas, the orientation feature being a vision system, providing the RFID components with surface characteristics of opposing faces different from each other, providing the RFID components with differently shaped opposing faces, providing the RFID components with opposing faces with identical operative features for joining with the RFID antennas, or combinations thereof

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
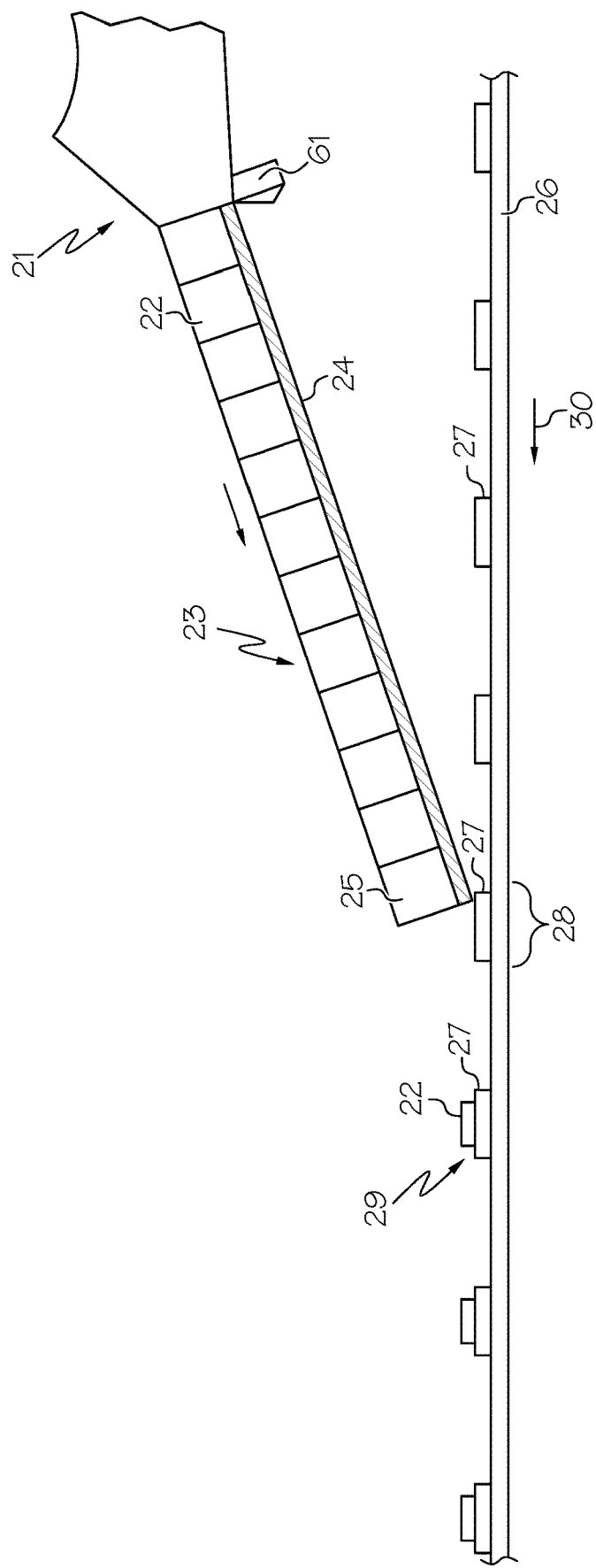
FIG. 1 is a diagrammatic side or elevational view of an embodiment that feeds individual RFID chips from a vibratory feeder onto an antennas containing web for assembly of chip to antenna with start-and-stop web movement.

A vibratory feeder is generally indicated at 21 in FIG. 1. This feeder 21 is provided for the purpose of receiving RFID elements 22 such as chips, herein variously referred to as RFID components, in a non-ordered or random fashion typically by dumping a plurality of such RFID elements into the bowl of the vibratory feeder 21. In accordance with its known function, the vibratory feeder 21 the RFID components 22 ride on an acoustic wave and achieve "singulation" of the initially randomized plurality of RFID elements, resulting in a stream 23 of the signulated RFID components or elements that flows along a support 24 such as an exit ramp of the vibratory feeder. The stream provides a series of lead RFID element or chip components 25 as the RFID elements move along, typically in a downward direction, the support 24. Each newly presented lead RFID element or component 25 exits the ramp to the next phase of the system, to be immediately replaced by the next chip in the stream that becomes the current transient lead RFID element or chip component 25.

While it will be appreciated vibratory feeders are well known and used in various levels of manufacturing and product handling, in order to take parts in a random orientation in a bowl or the like and create a stream of single items to be delivered in a controlled manner, usually one at a time. The overall operation of a vibratory feeder can be described as a "singulation" of random parts or components to allow for single-part presentation to a manufacturing or processing operation. It will be understood that the action of vibratory feeders causes the parts in the bowl to engage each other with relative motion of the parts that is best suited to parts that will not be damaged by such relative motion and engagement, as well as the energy applied to the bowl to achieve rapid vibration and relative movement of the parts. While the parts ride on an acoustic wave, the action necessarily involves impacts of parts on parts. RFID elements or chips, being made primarily of silicon, are damaged by the forces applied to the elements or chips by such relative motion and vibratory action. Such forces tend to cause chipping and other damage to RFID element or chip components.

The present disclosure modifies or substitutes for typical RFID elements or chips to provide the RFID elements 22 such as chips which are dumped into the vibratory feeder bowl, singulated into the stream 23 are presented as the lead RFID element or chip component 25, and secured to the RFID antennas 27. Specifically, in accordance with the present disclosure, the vibratory feeder system is adapted to non-silicon chips such as printed parts, which can withstand impacts, allowing the RFID element or chip components 22 to be released from a wafer all at once and dropped into the feed hopper for vibratory feed action and singulation without damage to the RFID element or chip components 22. The RFID element or chip components are formed on or of relatively flexible substrates such as plastics. Typical plastics include polymers and non-hydrocarbon plastics. Due to the nature of these components, they are very resistant to damage caused by contact with other chips in the bowl feeder.

RFID element or chip components 22 include ones that are inherently flexible and with printed electronics, such as being made primarily from non-silicon organic or inorganic semiconductors, including polymers and metal oxide semiconductors. Some can be based on polythiophene, the polymer semiconductor, printed on a relatively flexible material such as polyester film. Other polymer semiconductors could be used for printing the circuitry as desired.

Also illustrated in FIG. 1 is a web 26 on which is positioned a plurality of RFID antennas 27 spaced along the web in end-to-end fashion. Typically each RFID antenna 27 includes a securement feature such as a coating on its upper surface for facilitating securement of an RFID element or chip component 22 to the antenna 27, examples including adhesives such as pressure sensitive adhesives, heat sensitive adhesives, pressure and heat sensitive adhesives, anaerobic adhesives, epoxy adhesives such as conductive epoxy. Other options for securing the RFID antennas and chips together, including other adhesive systems and energy-based systems or magnetic systems associated with the components being assembled. In a specific embodiment, the lead RFID element or chip component 25 is ejected onto the RFID antenna 27 into or onto an adhesive, and pressure and heat is applied to complete the bond, such being supplied by a moving web or belt downstream of a transfer station 28. Whatever mechanism or material is used, the result is securement of the RFID antenna to the RFID element or chip component.

It will be appreciated that at times supplemental components are included on RFID antennas and/or RFID element or chip components, typically to enhance attachment capabilities and/or improve functionality. These can take the form of interposers, pads and the like. When reference herein is made to RFID antennas or chips, and particularly of RFID antennas, it will be understood that any such reference is not intended to exclude these types of components. Thus, for example, when referring to RFID antennas, it will be understood to include RFID antennas with or without interposers, pads or the like and/or to assembly at or not at an interposer, pad or the like rather than directly to the antenna material.

The lead RFID element or chip component 22 and RFID antenna 27 meet at the transfer station 28 at which location these components engage each other and activate the securement action resulting in combining these parts into and form an RFID device 29 with functionality for a passive RFID application. With this illustrated embodiment, the web 26 follows a move and stop flow pattern. Suitable controls such as those known in the art time operation of the web 26 with the presentation of a lead RFID element or chip whereby the antenna and chip reach the transfer station 28 at essentially the same time for initiating the securement action by which the RFID device 29 is formed. The web 26 translates in a linear direction of motion as illustrated by the arrow marking 30 on FIG. 1 through the use of a suitable translating mechanism available in the art. Mechanical support for lateral movement or translation and stopping of the web typically is provided in accordance with machinery, devices, structures and/or materials known in the art such as conveying systems.

This linear direction translation of the web stops when an RFID antenna reaches the transfer station, at which time the lead RFID element or chip component 25 is deposited on and engages the RFID antenna that is at the station at that time. In this embodiment, the web is stationary with respect to the element or chip at the time of ejection of the lead RFID element or chip component 25. Thereafter, the web movement continues, with the RFID devices 29 moving downstream of the transfer station. When desired, completion of the securement action can take place once the combined units move to another processing station downstream of the transfer station.

Figure 2:
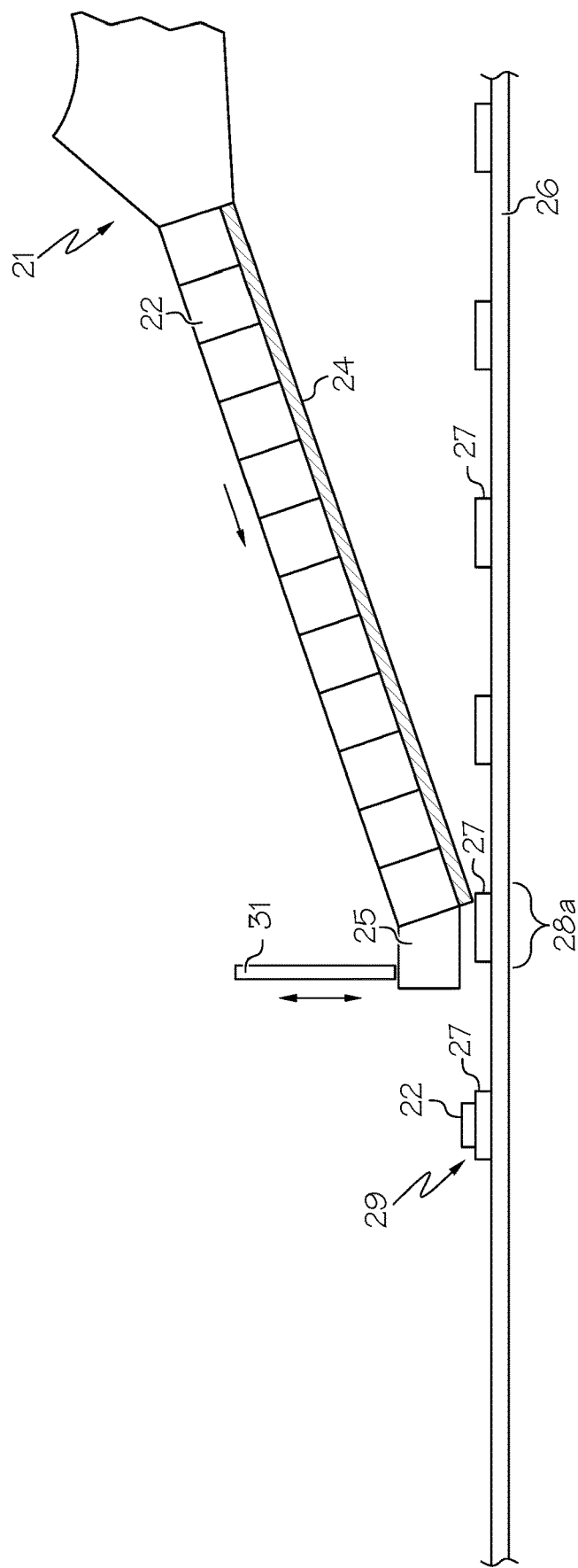
FIG. 2 is a diagrammatic side or elevational view of an embodiment along the lines of FIG. 1 while also providing a pin push-down system.

FIG. 2 shows an embodiment that is a variation on the approaches illustrated in FIG. 1. This incorporated the move and stop system of the web 26 for receiving the lead RFID element or chip component 25 where securement action in initiated. This FIG. 2 embodiment adds features whereby the lead RFID element or chip component 25 is pushed down onto the web by a pin or pusher 31 positioned above a transfer station 28a. This pin or pusher asserts a downward force on the lead RFID element or chip component 25 to apply pressure in assisting with securement action for joining together the RFID element or chip component and the RFID antenna 27 to form the RFID device 29.

Figure 3:
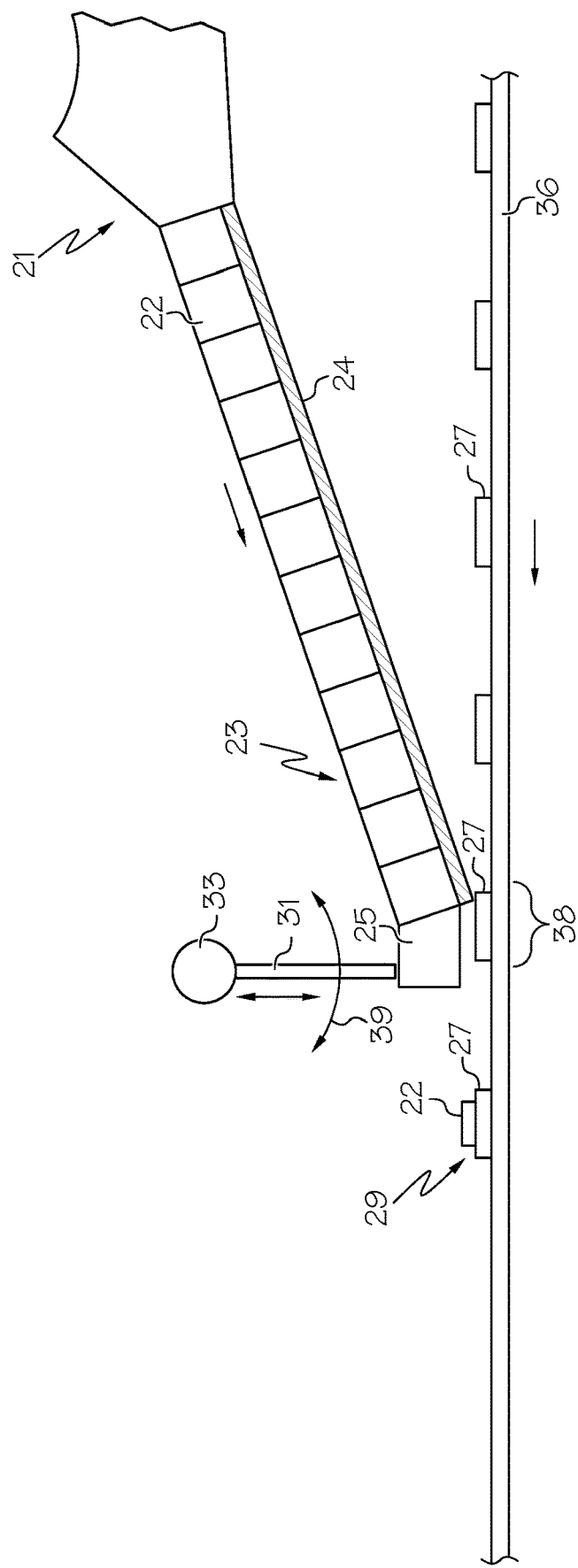
FIG. 3 is a diagrammatic side or elevational view of an embodiment including the basics of FIG. 2 and adding a pivot feature for allowing for acceleration of each placed chip allowing for continuous web motion.

Concerning FIG. 3, this approach modifies an embodiment of the approaches illustrated by FIG. 2. Instead of a move-and-stop action web, a continuous-motion web 36 is provided. During normal operation, web 36 continues to flow without having to stop to load the feed RFID element or chip component 25 onto the RFID antenna 27 at transfer station 38. It will be appreciated a line of RFID antennas 27 are positioned along the web 36, being spaced according to the timing set for synchronizing the system. To accommodate a continuous motion web 36, a pin or pusher 32 is provided that is modified from pin or pusher 31 of FIG. 2, which moves essentially along a linear (typically vertical) path. A pivot mechanism 33 is associated with pin or pusher 32 whereby the pin or pusher 32 is able to follow movement of the RFID antenna 27 while within the transfer station 38. In doing so, the pin or pusher 32 follows a swinging motion as illustrated at 39 in FIG. 3 allowing the lead RFID element or chip component 25 to accelerate until it moves at a speed that matches the motion speed of the continuous flow web 36, thereby allowing the web 36 to move continuously.

Figure 4:
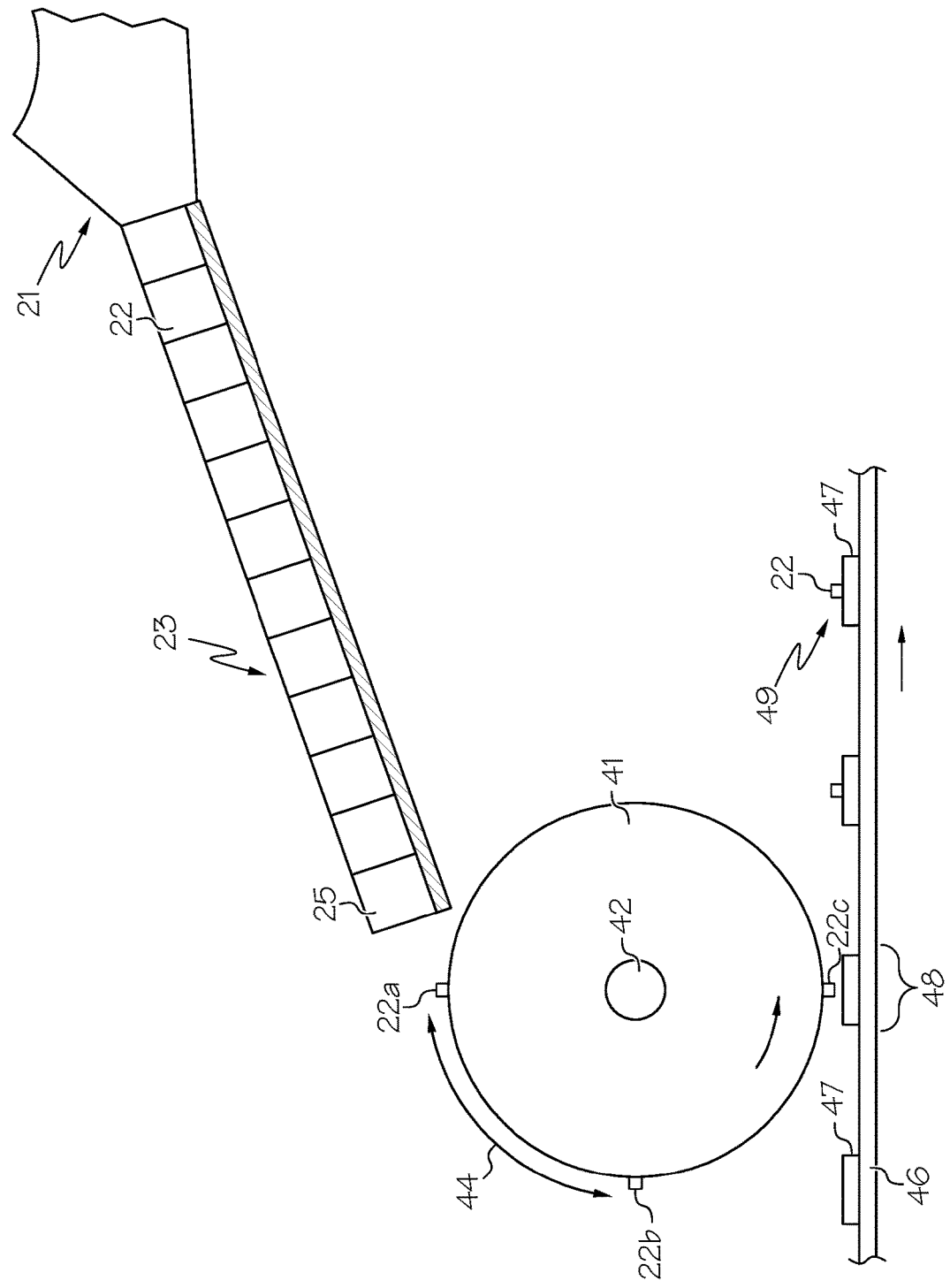
FIG. 4 is a diagrammatic side or elevation view of an embodiment featuring a vacuum cylinder for matching RFID chip feed to web speed.

A further alternative embodiment for effecting well-timed engagement between RFID chip flow and antenna flow is illustrated in FIG. 4. This embodiment also incorporates a continuous-flow web 46, while positioning a vacuum cylinder mechanism 41 that rotates along an axis 42 in a counter-clockwise direction as viewed in FIG. 4. As with other embodiments described herein, the vibratory feeder 21 receives a plurality of RFID element or chip components 22, singulates them into the stream 23, and presents a series of lead RFID element or chip components 25.

As each lead element or chip component 25 is ejected from the stream 23 and is presented at the vacuum cylinder mechanism 41, the vacuum application locates the element or chip component on the outer cylindrical surface of the rotating vacuum cylinder mechanism 41. This interaction effects acceleration such that the element or chip component 22a on the vacuum cylinder mechanism 41 has a radial velocity or rotational speed that correlates with the linear speed of the continuous-flow web 46 and at the desired pitch to coordinate with the desired pitch on the web 46. When RFID antennas 47 are included, as illustrated in FIG. 4, the desired pitch corresponds to the pitch of the series of antennas on the web 46. This action can include having the vacuum cylinder accelerate to the chip to match web speed at the desired pitch for web contact, accept the chip ejected onto the cylinder, and achieve the radial velocity or rotational speed that accurately coordinates with the desired pitch.

In the embodiment where the RFID elements or chip components are engaged with and secured to a series of flowing RFID antennas 47, the arrow path 44 between component 22a and component 22b along the cylindrical face of the vacuum cylinder 41 correlates to the antenna pitch on the web 46. In general, the radial velocity of the vacuum cylinder 41 matches the web speed, or may correlate to the web speed so the overall system is properly synchronized. Proper synchronization allows for consistent accurate placement of an RFID component 22c at the transfer station 48 to achieve proper alignment of RFID component 22c with the RFID antenna 47 and ultimate assembly of the RFID device 49.

Figure 5:
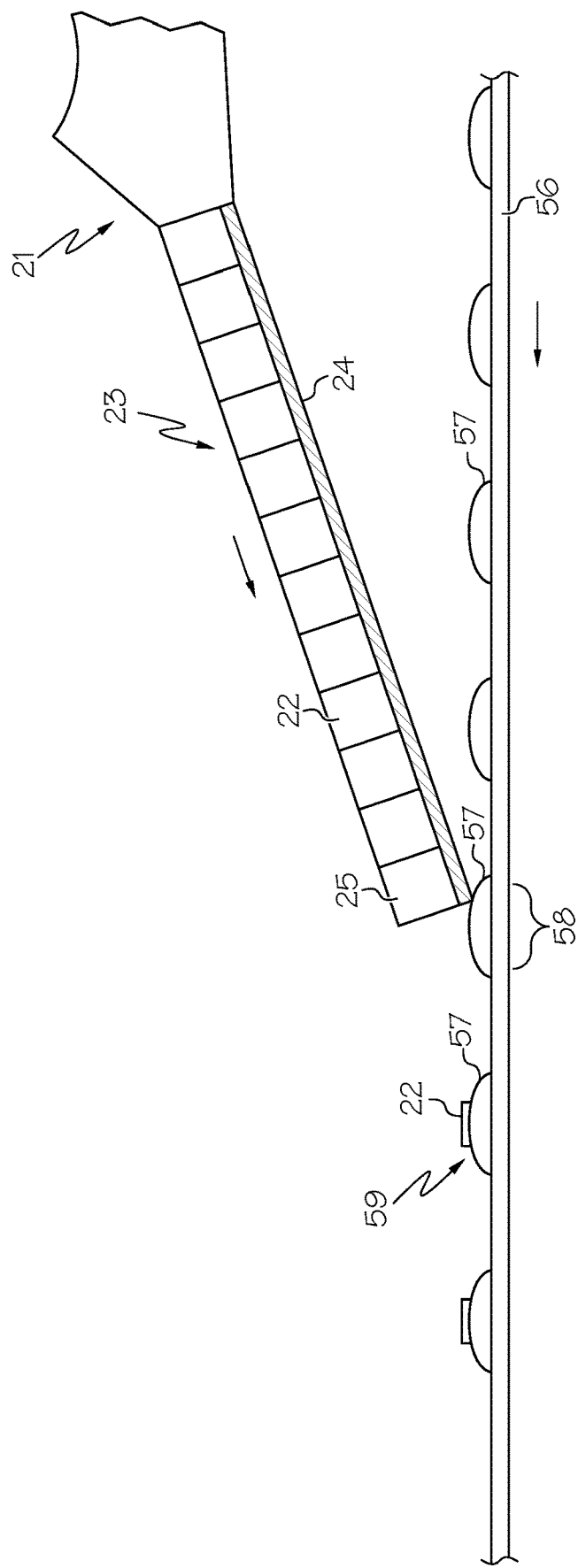
FIG. 5 is a diagrammatic side or elevation view of a further embodiment of a feed and assembly unit by which each lead chip from the flow from the vibratory feeder is pulled from the chip dispenser by engagement with an antenna or interposer component.

The FIG. 5 embodiment features pulling the lead RFID component 25 from the dispenser or stream 23 of RFID components 22 on the support 24 leading out of the vibrating feeder 21. This pulling out or pulling from the dispenser is initiated by engagement with a component on the moving web 56. Such component can be an RFID antenna 57 that drags the lead RFID element or chip 25 away from the dispenser or stream as the antenna moves through the transfer section 58. RFID antenna 57 typically will include a securement feature for initiating dislodgement of the lead RFID element or chip 25 and maintenance of connection between chip and antenna. Securement features in this regard include adhesives, including same with sufficient tack to achieve a desired result and eventual securement of chip and antenna into RFID devices 59, as well as other securement features including securement elements and approaches noted herein. With this approach, the web 56 can continue to move and move at a constant velocity, with the constant velocity enhancing the ability of the antenna component to engage and "drag" the lead RFID element or chip component. The element or chip component is pulled from the dispenser by the antenna (with or without interposer or other components as discussed herein) at the position it needs to be attached by a surface feature engaging with the chip edge.

Typically the RFID devices 29, 49, 59 are finished RFID devices in that they including traditional basis components of RFID element or chip and RFID antenna. Same can be further modified as desired, in which case, the devices 29, 49, 59 form what might be considered intermediate components in making desired complete RFID products such as tags and the like. These embodiments create antenna components in a system of creating RFID components added at a later stage to manufacture the final RFID device. This is a typical approach for manufacturing RFID tags, and the antenna component is coupled to the RFID element at a later stage, on the same line or a separate line.

As will be appreciated by those skilled in the art, the securement feature can be achieved in various manners including use of securement elements and approaches. Included are the following. If the surface area of engagement surfaces on the RFID element or chip component 22 (for example pads) are large enough, securement may occur via capacitance through a dielectric adhesive such as a pressure sensitive adhesive. Use an epoxy adhesive, such as an anisotropic conductive paste that contains particles to facilitate a good joint when the RFID element or chip 22 is compressed against the bond pads and heat is applied. These bond pads can be on the RFID antenna. Coat a front surface of the RFID element or chip 22 with an adhesive during its manufacturing process, examples of adhesives being hot melt adhesives, including heating either or both of the element or chip 22, or of the web or cylinder prior to and/or during assembly and securement. Weld using ultrasonic methods, where the flexibility of the RFID element or chip 22 and the ability to tune the thickness and the drive frequency to achieve maximum effect, such as resonance. Weld using electrical methods, where side contacts connecting to the front contacts formed on the RFID element or chip component 22 allow a welding voltage to be applied without needing access to the front furnace during the process.

Further regarding securement features and approaches, the RFID element or chip components and/or RFID antennas may have a coupling structure such as magnetic loops and/or pads attached. Coupling or securement between the RFID antennas and the RFID element or chip loops, pads or other coupling structures or interposers can be by magnetic fields, by electric fields, by a combination of both magnetic and electric fields, or by a conductive connection using a conductive adhesive. Alternatively, the RFID antennas can be welded to the RFID elements or chips.

Other features of the present disclosure that can be practiced as desired concern enhancing proper alignment of the RFID elements or chips 22 as they vibrate within the bowl of the vibratory feeder and are presented onto the support 24 to form a stream 23 within which all or substantially all of the RFID elements or chips 22 are properly aligned for engagement with and securement to the RFID antennas. These features address a problem with bowl feeders for parts that are symmetrical in shape but need to be aligned such that the proper face or surface of the part is positioned for a next step, in this case the securement initiated at the transfer station 28a, 38, 48, 58. For example, typical RFID chips are symmetrical with the result they can leave the vibratory feeder either face up, and one of the faces is designed for working relationship with the RFID antenna, while the other side is not so designed. Accordingly, without further modification, RFID chips will leave the vibratory feeder and form a stream of chips, some "right side up" and some "upside down".

One solution to this problem is to include a monitor (61 in FIG. 1) such as a vision system that identifies chips positioned at the wrong orientation and ejects them back into the bowl after or before they enter the stream, through a suitable return mechanism (not shown). Another solution modifies the chips themselves to present a mechanical surface on one face that is different from the mechanical surface of the other face. In one embodiment of this type, one surface is smooth and the other is rough, which allows the bowl vibration processing to pick up for movement to the stream only chips that feature the surface that presents the desired orientation of the chip. A further embodiment of this type may be shaped in which can be considered to be "3D"; for example, a flat side on one face and a curved side on the opposite face, and chips with a curved side will tend to fall back into the bowl as they do not engage with the feeder spiral in a stable fashion. A further solution is to manufacture the RFID elements or chips 22 in a way that orientation is not important; for example, each of the top and bottom face has identical components, including identical contacts for engagement with the RFID antenna.

From the above, it will be understood that this mechanism and system allows for flexible manufacture of RFID devices according to different approaches for engaging components with each other and securing them together into RFID devices. The method and system achieve these advantageous results with significantly lower capital expenditure due to the relative lack of expense of equipment in the nature of vibrating feeders that can be used advantageously for handling and singulating RFID elements or chips without damaging same.

It will be understood that the movements and/or start and stop movements of the webs described herein are capable of being controlled by suitable movement generators and controllers. For example, software can be incorporated in a suitable control system that allows the operator to select among numerous combinations of web flow speed and production line output. It is possible to vary such parameters as desired and to provide a flow of and engagement of components to form the RFID devices according to the selected configurations and parameters.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A system for making RFID devices, comprising:
   a plurality of radio frequency identification (RFID) components, the RFID components being RFID elements or chips that are flexible;
   a vibratory feeder containing the plurality of RFID components, wherein the vibratory feeder moves and orients the RFID components and dispenses the RFID components in at least one stream of RFID components, the leading one of which is a lead RFID component;
   an upstream movable support located upstream of a transfer station, and a plurality of RFID antennas in an ordered sequence on the upstream movable support, wherein the RFID components include an orientation feature for enhancing orientation of the RFID components with respect to the RFID antennas, the orientation feature comprising RFID components with a first surface that is smooth and a second surface that is rough, or RFID components with a first surface that is flat and a second surface that is curved;
   a pusher positioned above the transfer station configured to engage the lead RFID component into engagement with one of the RFID antennas while at the transfer station, whereby a combined RFID component and antenna is assembled; and
   a downstream support located downstream of the transfer station, the downstream support collects the combined RFID component and antenna for an RFID device.

2. The system in accordance with claim 1, wherein the upstream movable support and the downstream support comprise a unitary movable support that passes through the transfer station, which unitary movable support stops to present one of the RFID antennas at the transfer station, whereby the lead RFID component is dispensed onto said one of the RFID antennas, which unitary movable support resumes movement after the combined RFID component and antenna is assembled at the transfer station.

3. The system of claim 1, where the pusher is configured to exert a downward force on the lead RFID component to assist in forming the combined RFID component and antenna.

4. The system in accordance with claim 1, wherein each of the plurality of RFID components, each of the plurality of RFID antennas or both have a securement feature selected from the group consisting of adhesives, conductive adhesives, dielectric adhesives, pressure sensitive adhesives, epoxy adhesives, anisotropic conductive paste, heat sensitive adhesives, heat and pressure sensitive adhesives, hot melt adhesives, welding, ultrasonic welding, electronic welding, magnet field systems, electronic field systems, and combinations thereof.

5. The system in accordance with claim 1, wherein the RFID components are non-silicon chips of flexible plastic material with printed electronics.

6. The system in accordance with claim 1, wherein the further comprises monitoring with a vision system.

7. A system for making RFID devices, comprising:
   a plurality of radio frequency identification (RFID) components, the RFID components being RFID elements or chips that are flexible non-silicon chips of flexible plastic material with printed electronics;
   a vibratory feeder containing the plurality of RFID components, which vibratory feeder moves and orients the RFID components and dispenses the RFID components in at least one stream of RFID components, the leading one of which is a lead RFID component;
   a movable support configured to follow a move and stop flow pattern;
   a transfer station located along the movable support;
   a plurality of RFID antennas in an ordered sequence on the movable support upstream of the transfer station, wherein the RFID components include an orientation feature as the RFID components vibrate in the vibratory feeder, the orientation feature enhancing orientation of the RFID components with respect to the RFID antennas, the orientation feature comprising RFID components with a first surface that is smooth and a second surface that is rough, or RFID components with a first surface that is flat and a second surface that is curved;
   a securement feature of the RFID component, the RFID antenna or both, the securement feature being selected from the group consisting of adhesives, conductive adhesives, dielectric adhesives, pressure sensitive adhesives, epoxy adhesives, anisotropic conductive paste, heat sensitive adhesives, heat and pressure sensitive adhesives, hot melt adhesives, welding, ultrasonic welding, electronic welding, magnet field systems, electronic field systems, and combinations thereof;
   the transfer station provides a location at which the lead RFID component engages one of the RFID antennas while at the transfer station when the movable support is stationary with respect to the lead RFID component, whereby a combined RFID component and antenna is assembled, the combined RFID component and antenna is an RFID device; and
   a control system.

8. The system in accordance with claim 7, wherein the orientation feature further comprises monitoring with a vision system.

9. The system in accordance with claim 7, where the flexible non-silicon chips comprise a polymer semiconductor printed on a polyester film.

10. The system in accordance with claim 9, where the polymer semiconductor is polythiophene.

11. A method for making RFID devices, comprising:
    providing a plurality of radio frequency identification (RFID) components, the RFID components being RFID elements or chips that are flexible and having an orientation feature comprising RFID components with a first surface that is smooth and a second surface that is rough or RFID components with a first surface that is flat and a second surface that is curved;
    depositing the plurality of RFID components into a bowl of a vibratory feeder and moving and orienting the RFID components in vibratory feeder bowl;
    dispensing the RFID components in at least one stream of RFID components, the leading one of which is a lead RFID component;
    presenting a movable support having a plurality of RFID antennas in an ordered sequence on the movable support, the movable support following a move and stop flow pattern and having a transfer station therealong;

engaging, while at the transfer station, the lead RFID component with one of the RFID antennas and assembling same into a combined RFID component and antenna; and collecting the combined RFID component and antenna and providing an RFID device therefrom.

12. The method in accordance with claim 11, wherein the movable support stops to present one of the RFID antennas at the transfer location, whereby the lead RFID component is dispensed onto said one of the RFID antennas, and resuming movement of the movable support after the combined RFID component and antenna is assembled at the transfer station.

13. The method in accordance with claim 11, further including orienting the RFID components by means of the orientation feature as the RFID components vibrate in the vibratory feeder, the orienting enhancing orientation of the RFID components with respect to the RFID antennas for the engaging to form the combined RFID components and antennas, the orienting further comprising monitoring with a vision system.

14. The method in accordance with claim 13, further comprising ejecting RFID components positioned in the wrong orientation back into the bowl of the vibratory feeder.

15. The method in accordance with claim 11, further comprising applying pressure and heat to bond the combined RFID component and antenna.

16. The method in accordance with claim 11, where engaging comprises pushing the lead RFID component down onto one of the RFID antennas by a pusher.

17. The method in accordance with claim 11, further comprising monitoring the at least one stream of RFID components.

* * * * *